Inventors
AUGUST KRUIS
HANS MANHARD
By Toulmin & Toulmin
Attorneys

Inventors
AUGUST KRUIS
HANS MANHARD
By Toulmin & Toulmin
Attorneys

United States Patent Office 3,360,588
Patented Dec. 26, 1967

3,360,588
PROCESS AND APPARATUS FOR SEPARATING
AND HYDROGENATING GAS MIXTURES
August Kruis, Pullach, Isartal, and Hans Manhard, Munich, Germany, assignors to Gesellschaft für Linde's Eismaschinen Aktiengesellschaft, Munich, Germany
Filed Apr. 17, 1964, Ser. No. 360,506
Claims priority, application Germany, Apr. 19, 1963, G 37,560
11 Claims. (Cl. 260—683.9)

ABSTRACT OF THE DISCLOSURE

Separation of an undesired acetylenic compound, e.g. acetylene, from a mixture thereof with at least two other components, one more volatile and one less volatile, e.g., ethane and ethylene, by rectification to produce a side stream of enriched acetylene-containing liquid, pumping resultant liquid to high pressure in a liquid pump, catalytically hydrogenating high pressure stream to convert acetylene to ethylene, passing at least a portion of ethylene-enriched liquid to a point in the process downstream of the main gas compressor.

---

Figure 1:
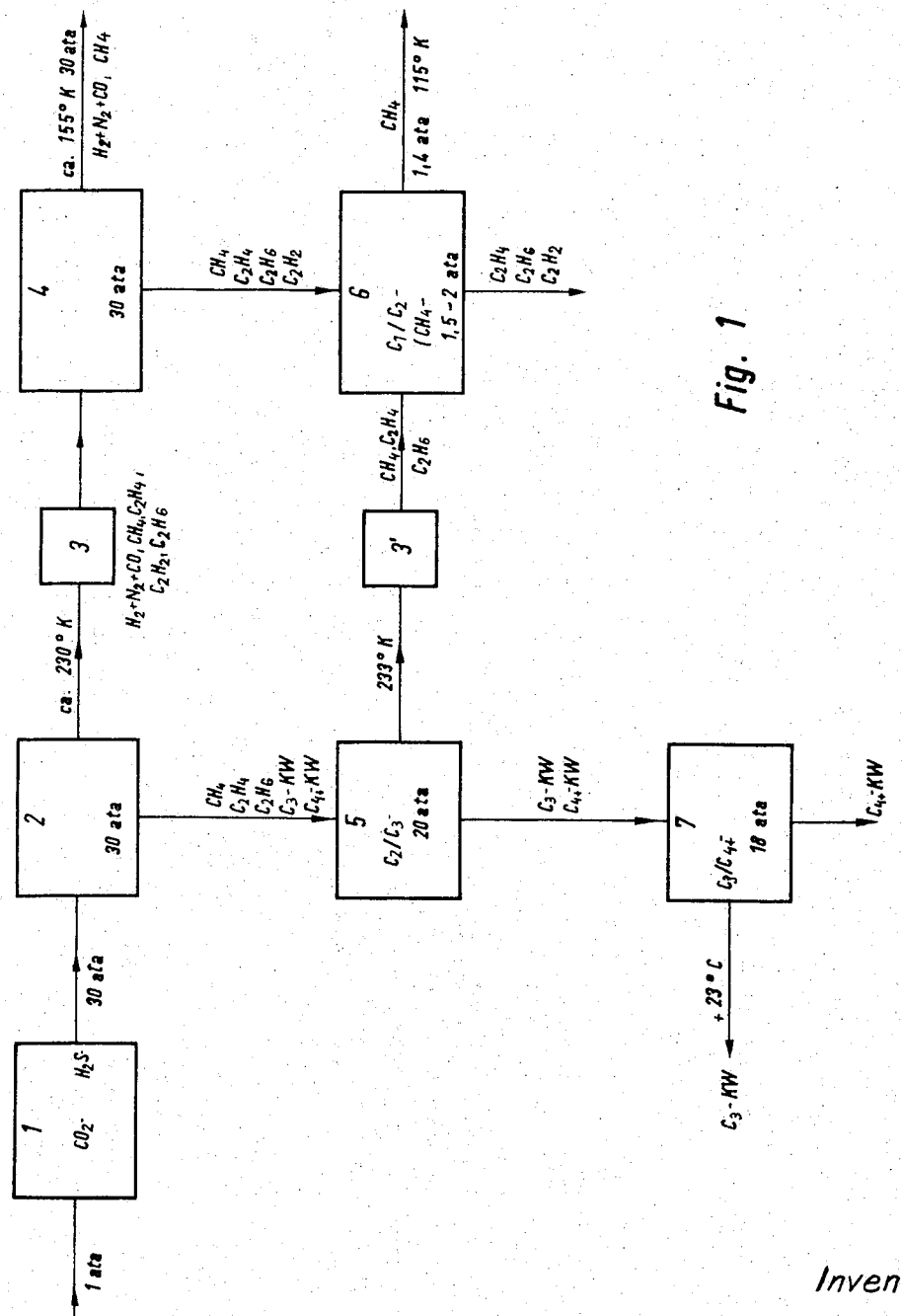

The present invention relates to a process and an apparatus for the separation of liquid mixtures of different boiling points. More particularly, it relates to a process and an apparatus for the separation of liquid mixtures in which one component may be selectively hydrogenated and has a vapor pressure in the mixture which lies between the vapor pressures of the other components of the mixture.

In the past when it has been necessary to separate mixtures of several liquid components into the individual pure components of the mixture several separate rectification steps have been necessary and when separating $n$ components, $n-1$ rectification columns were generally required.

However, rectification has not always been suitable for the separation of all types of liquid mixtures. For example, such a process could not be satisfactorily used when one of the components of the mixture present in only small quantities, had a vapor pressure lying between the vapor pressures of the other components of the mixture. When such traces of components were ignored they were normally enriched in the center region of the rectification column used to separate two principal components, with the result that both the heads and tails from the rectification column were contaminated with the third component present in only small proportions in the original mixture. This made it necessary to separate such components, although present only in traces in the original mixtures. It has been the custom previous to the present invention to separate such traces of components by rather complicated procedures. It was necessary, for example, either to use a special, tall rectification column with a large number of plates, or to draw off the trace ingredients with the component which did not have to be recovered in the pure state, with the result that high losses of this component were incurred.

Another case where separation of components of liquid mixtures could be effected only with difficulty by the use of $n-1$ columns is when low temperature of gas mixtures is required, as for example, those obtained in the cracking of methane, ethane, propane, light gasoline or crude oil whereby several hydrocarbon fractions are obtained containing $C_2-$ hydrocarbons (ethane, ethylene, acetylene), and another contains the $C_3-$ hydrocarbons (propane, propylene, methylacetylene, propadiene). These $C_2-$ and/or $C_3-$ hydrocarbon mixtures, due to the formation of azeotropes, cannot be separated into the individual components by an ordinary rectification.

For example, on the basis of the vapor pressure curves of ethylene, ethane and acetylene, the latter would have the highest boiling point, ethylene should have the lowest boiling point, and ethane should have a boiling point between that of acetylene and ethylene. From this it would be anticipated that by continuous rectification the ethylene could be drawn off as a pure product from the head of the distillation column, and that the ethane and acetylene should be obtainable from the sump of the column, i.e., at the bottom. Unfortunately, however, the binary system ethane-acetylene forms an azeotrope, and consequently the vapor pressure of the acetylene in the ternary system actually falls between that of ethane and that of ethylene. Accordingly, the acetylene, during any rectification of mixtures of $C_2-$ hydrocarbons, becomes enriched in the central plates of the rectification column, the exact location of which will depend upon the composition of the mixture, however, the concentration of the ethylene at this location will still be quite high. The production of pure ethylene, therefore, in a continuous rectification using a single rectification column becomes possible only with heavy losses of ethylene in the sump fraction.

Similar conditions exist with mixtures of $C_3-$ hydrocarbons from which it is desired to produce pure propylene.

Difficulties of the above kind have been overcome in the past by removing the acetylenic hydrocarbons by the use of a number of procedures, such as by physical or chemical absorption in a selective solvent either prior to rectification of the fraction containing the acetylenic hydrocarbons, or by removing them from the head product during the rectification (of German Patent No. 953,700).

The processes described above, even under most favorable conditions, are subject to various disadvantages: The outlay for apparatus required by them is great, they consume large quantities of energy, it is necessary to add a material which can contaminate the product being recovered, losses of the desired product are incurred by the separation of such contaminating agent used in the separation.

Acetylenic hydrocarbons have also been removed by selective catalytic hydrogenation. This hydrogenation purification can be carried out in practice either in the crude gas stream or in the $C_2-$ hydrocarbon fraction prior to the rectification thereof (of U.S.P. No. 2,938,934), or by the catalytic hyrogenation of the product obtained after rectification.

The disadvantages of the hydrogenation of the crude gases consist in the necessity for large instillations and extensive use of catalysts since the latter become inactivated with catalyst poisons which are of very low volatility. The selective hydrogenation of the $C_2-$ or the $C_3-$ fractions prior to rectification thereof has the disadvantage of requiring relatively large instillations, and of the contamination of the final product with an excess of hydrogen and impurities. The hydrogenation of the final product is beset with the drawback that the pure product also contains an excess of hydrogen and impurities, as well as the higher hydrocarbons formed during the hydrogenation.

Procedures are also known which take advantage of the enrichment of the acetylene during the rectification of the $C_2-$ fraction upon an intermediate plate of the column. According to the process disclosed in German Patent No. 677,968, at this location where the maximum enrichment of the acetylene occurs, a part of the mixture undergoing rectification is removed in the gaseous state, heated, and then subjected to a physical, selective washing with water under pressure, the mixture freed from acetylene and then returned to the $C_2-$ rectification column. This procedure also is subject to the disadvantagess pointed out above for any absorptive process.

According to the procedure disclosed in German Patent No. 1,110,668, a liquid mixture enriched with acetylene is withdrawn from the $C_2-$ rectification column, and then in a separate column separated into an ethylene fraction containing no acetylene and an ethylene fraction high in acetylene. The disadvantages of this procedure consist in the fact that in the additional column, for reasons of safety, enrichment only up to a maximum of 42% acetylene can be effected, with the result that either $C_2-$ hydrocarbons will be lost, or that the operation must be followed with a selective washing, the disadvantages of which have already been pointed out.

The process of the present invention overcomes the disadvantages of the prior processes for the separation of multiple component mixtures containing one component of intermediate vapor pressure, and which may also be subjected to selective hydrogenation, by a method and apparatus employing much less apparatus and requiring very little energy as compared to prior processes.

The process of the present invention involves the combination of the following characteristics:

(a) The withdrawal, during rectification, of a multiple component system, of a portion of the component which can be subjected to selective hydrogenation, at the point of greatest enrichment of the component.

(b) Subjecting the withdrawn portion to selective hydrogenation.

(c) Returning the hydrogenated portion at the stage of the operation from which the portion was withdrawn.

According to an especially advantageous embodiment of the inventive concept of the invention, the portion withdrawn for selective hydrogenation at the point of greatest enrichment is withdrawn from the rectification column in the form of a liquid, so that it may be brought by the aid of a liquid pump to the required hydrogenation pressure, thus saving considerable energy. Preferably, the selective hydrogenation pressure is so high that the hydrogenated product can flow under its own pressure back into the rectification column at the point from which it was withdrawn.

The procedure according to the present invention is especially applicable to the separation of the $C_2-$ hydrocarbon mixture ethane-ethylene-acetylene, and to the separation of the $C_3-$ hydrocarbon mixture propane-propylene-methylacetylene-propadiene. In the latter mixture the methacetylene forms an azeotrope with the propane. The methylacetylene, as well as the propadiene are selectively hydrogenatable. It should be specifically noted, however, that the process can also be advantageously applied to all other cases where one component of a mixture can be selectively hydrogenated, and is enriched during rectification upon one intermediate plate of the column.

In order to obtain a pure final product during the rectification of a multiple component system, according to the process of the present invention, the same amount of the component is selectively hydrogenated as is contained in the crude gas entering the system, that is, the concentration of the selectively hydrogenatable component should remain constant in the column. This can be accomplished by two methods: First, there can be withdrawn from a centrally located plate of the rectification column such a portion of the rectifying mixture which has been enriched with the ingredient to be selectively hydrogenated, that the amount of the selectively hydrogenated component of said portion is just equal to the amount thereof which is fed into the column. In such a case the component withdrawn for selective hydrogenation is hydrogenated quantitatively. According to the second embodiment, a larger portion of the enriched mixture is withdrawn. That is, more of the component is withdrawn for selective hydrogenation than is introduced in the crude gas being introduced into the system. In this case the component undergoing selective hydrogenation is not hydrogenated quantitatively but only to the extent that the amount hydrogenated and the amount continuously entering the system in the fresh crude gas, are equal to each other.

As a rule, the portion withdrawn will be between $\frac{1}{30}$ and $\frac{1}{3}$ of the amount of $C_2-$ or $C_3-$ hydrocarbon entering the system, from $\frac{1}{10}$ to $\frac{1}{30}$ being preferably withdrawn in the case of $C_2-$ mixtures, and from $\frac{1}{3}$ to $\frac{1}{6}$ in the case of $C_3-$ mixtures.

The apparatus used for carrying out the process of the present invention comprises a rectification column for the separation of multiple component mixtures with a conduit leading from an intermediate plate thereof, through a pump to a hydrogenation system, and another conduit leading from the hydrogenation system through which the hydrogenated mixture is withdrawn and returned to the stage of the rectification column from which the mixture to be selectively hydrogenated was removed.

In carrying out the process of the present invention, catalytic hydrogenation in the gaseous phase may be used, if preferred, as well as liquid phase hydrogenation. As catalysts in either type process use can be made of selective hydrogenation catalysts of the type known to the art. In order that the component to be selectively hydrogenated be completely hydrogenated it is generally necessary to use a small excess of hydrogen, with the result that a small portion of the olefins in the mixture will also be hydrogenated. In the second embodiment described above, where incomplete hydrogenation of the component to be selectively hydrogenated is effected, it is possible to use catalysts of lower sensitivity, and the amount of hydrogen used is limited in order to accomplish selectivity.

The hydrogen to be used in the hydrogenation can be any known grade of hydrogenation quality hydrogen, from an outside source. However, if desired, the hydrogen remaining from the crude gas separation can be employed, any carbon monoxide present being first converted into methane by hydrogenation.

The advantages of the process of the present invention over the known hydrogenation procedures include the following: The amount of liquid or gas to be treated is smaller, and more enriched with respect to the component to be selectively hydrogenated than is the case in prior known processes, so that the size and amount of apparatus required in the process are materially reduced. Also, the amount of catalyst used and the rate of its attrition are much smaller. Of equal importance is the fact that the final rectification products do not contain any excess of hydrogen or hydrogenation products.

In comparison to the washing processes of the prior art, the process of the present invention has the advantage that no material is added during the separation which is alien to the process or products, and that no steps have to be taken for the removal of solvent vapors. There is also no danger of losing valuable materials, as is always the case when solvents must be regenerated. Just the opposite is the case in the present process: the amount of olefin produced is increased by the portion of the component which was selectively hydrogenated.

By comparison to the procedure in which pure ethylene is recovered by rectification of a fraction rich in acetylene in a separate column, the present process has the important advantage of requiring no additional column, the latter being replaced by a simple and cheap hydrogenation system.

For the preparation of the multiple component mixtures to be treated in accordance with the present invention, the $C_2-$ or the $C_3-$ hydrocarbon fractions can be prepared in several ways. One of these is diagrammatically shown in FIGURE 1, attached hereto.

From the cracking of a light gasolene fraction a gas mixture was obtanied having the following composition:

| | Percent by volume |
|---|---|
| $H_2+N_2+CO$ | 12.7 |
| $CH_4$ | 31.6 |
| $C_2H_4$ | 24.1 |
| $C_2H_6$ | 5.6 |
| $C_2H_2$ | 0.2 |
| $C_3H_6$ | 11.6 |
| $C_3H_8$ | 0.7 |
| $C_3H_4$ | 0.1 |
| $C_4+$ | 13.2 |
| $CO_2$ | 0.1 |
| S compounds | 0.1 |
| | 100.0 |

This gas is compressed to 30 atmospheres absolute pressure, the carbon dioxide and the sulfur compounds removed, and the gas then subjected to a stepwise liquefaction, whereby in the Stage 2 of the precooling the $C_3$— and the higher hydrocarbons together with some $C_2$— hydrocarbons and a small amount of methane are removed. The liquid fraction is broken down in the $C_2/C_3$ column at 20 atmospheres absolute pressure (Stage 5) into the $C_2$— hydrocarbons and methane, on the one hand, and the $C_3$— and higher hydrocarbons, on the other hand. The last named fraction is separated still further in Stage 7 by a rectification at 18 atmospheres absolute pressure into the $C_3$— hydrocarbons, which leave as head product at a temperature of $+23°$ C. and into the $C_4$— and higher hydrocarbon, which are the tail product. The mixture which remained gaseous in the precooling step 2 has a temperature of about 230° K. It is dried in Stage 3 and then cooled step by step to a lower temperature of about 155° K. (Stage 4), so that now there is present only as gases hydrogen, nitrogen, carbon monoxide and a portion of the methane. The residual gas is then passed in countercurrent flow to the crude gas to be separated, through Stages 4 and 2, and then leaves the instillation. The fractions which are obtained in liquid form in Stage 4 contain the $C_2$— hydrocarbons and methane. The latter are introduced together with the head product from the $C_2/C_3$ column, which was dried in Stage 3′, and passes from this column at a temperature of about 233° K. into the methane column (Stage 6) which operates at about 1.5–2 atmospheres absolute where they are separated into methane as the head product (temperature 115° K.) and a tail fraction which contains only the $C_2$— hydrocarbons.

The separation of the $C_2$— or $C_3$— fractions obtained according to the above or any other procedure, according to the process of the present invention will now be described by reference to some typical examples and schematic drawings, the same numerals always being used to describe the same parts.

Figure 2:
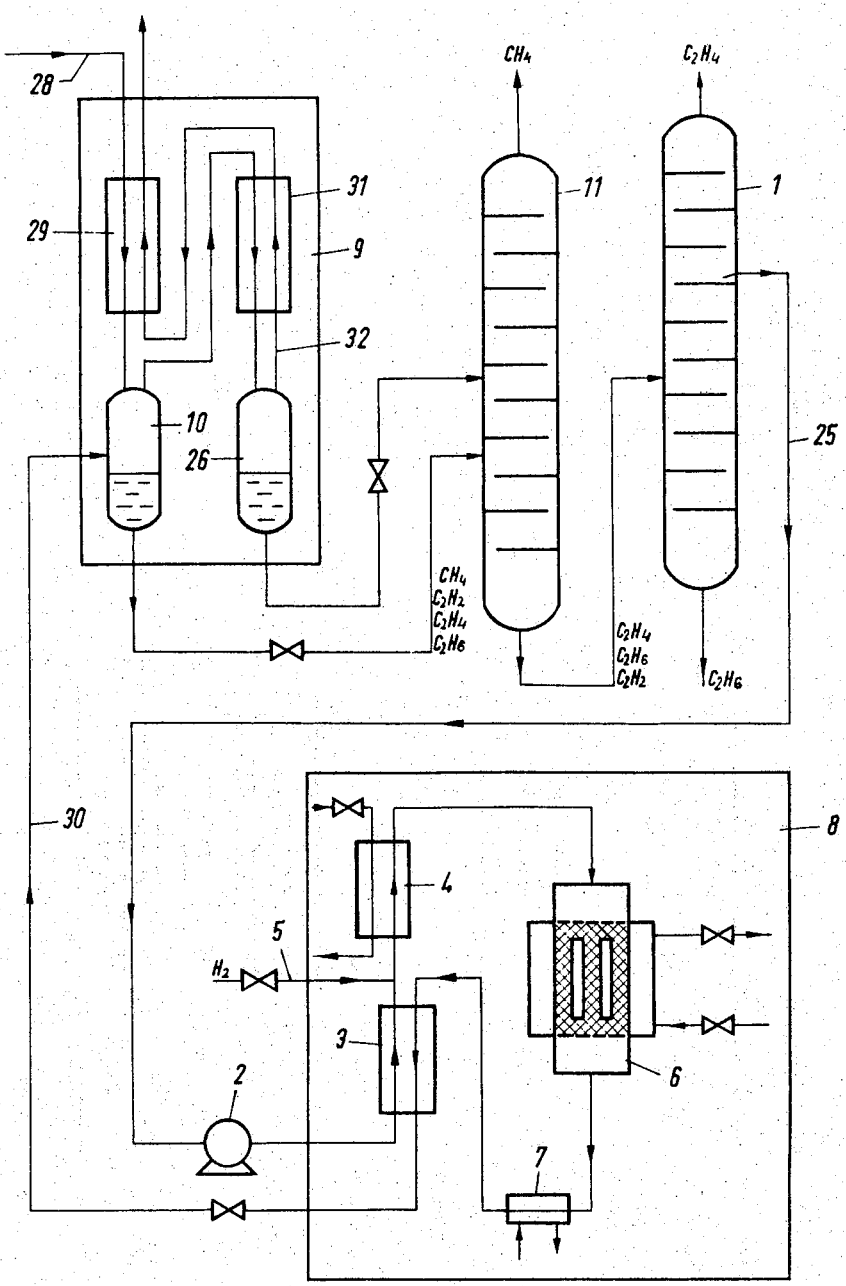

In Example I and the corresponding FIGURE 2, a procedure is described in which the portion of the mixture undergoing rectification, which is withdrawn from a central plate of an ethylene column, is selected so that just as much acetylene is contained as is supplied together with the crude gas in the same period of time. After the quantitative hydrogenation with an excess of hydrogen the mixture is introduced into the low-cooling step of the cracking-gas-separation unit.

Figure 3:
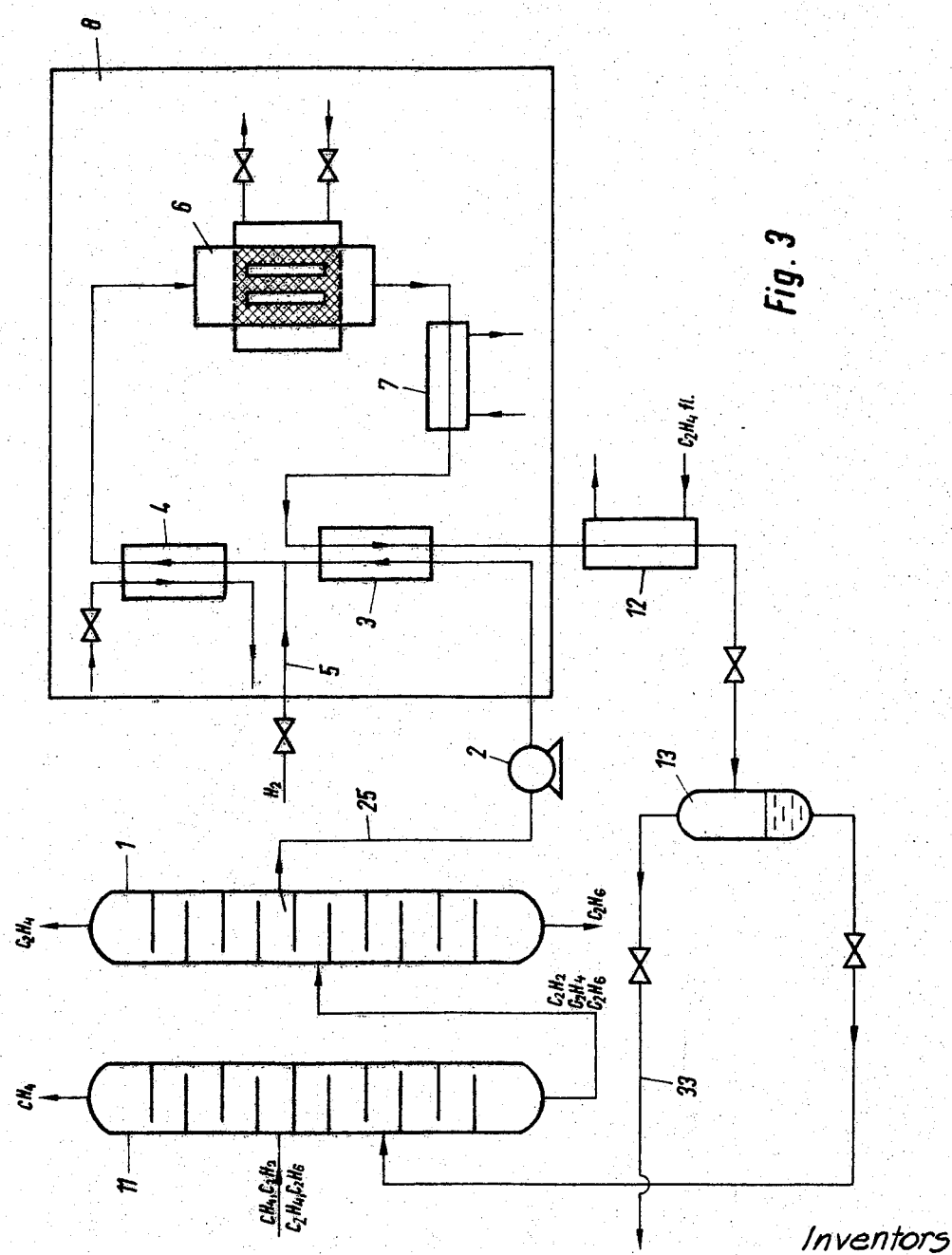

In Example II, which will be considered with reference to FIGURE 3, the static acetylene concentration in the ethylene column is somewhat smaller than in Example I. The hydrogenation takes place in the same manner as described in Example I. The liquid phase of the hydrogenated mixture, which after cooling is fed into a separator, is returned to the methane column.

Figure 4:
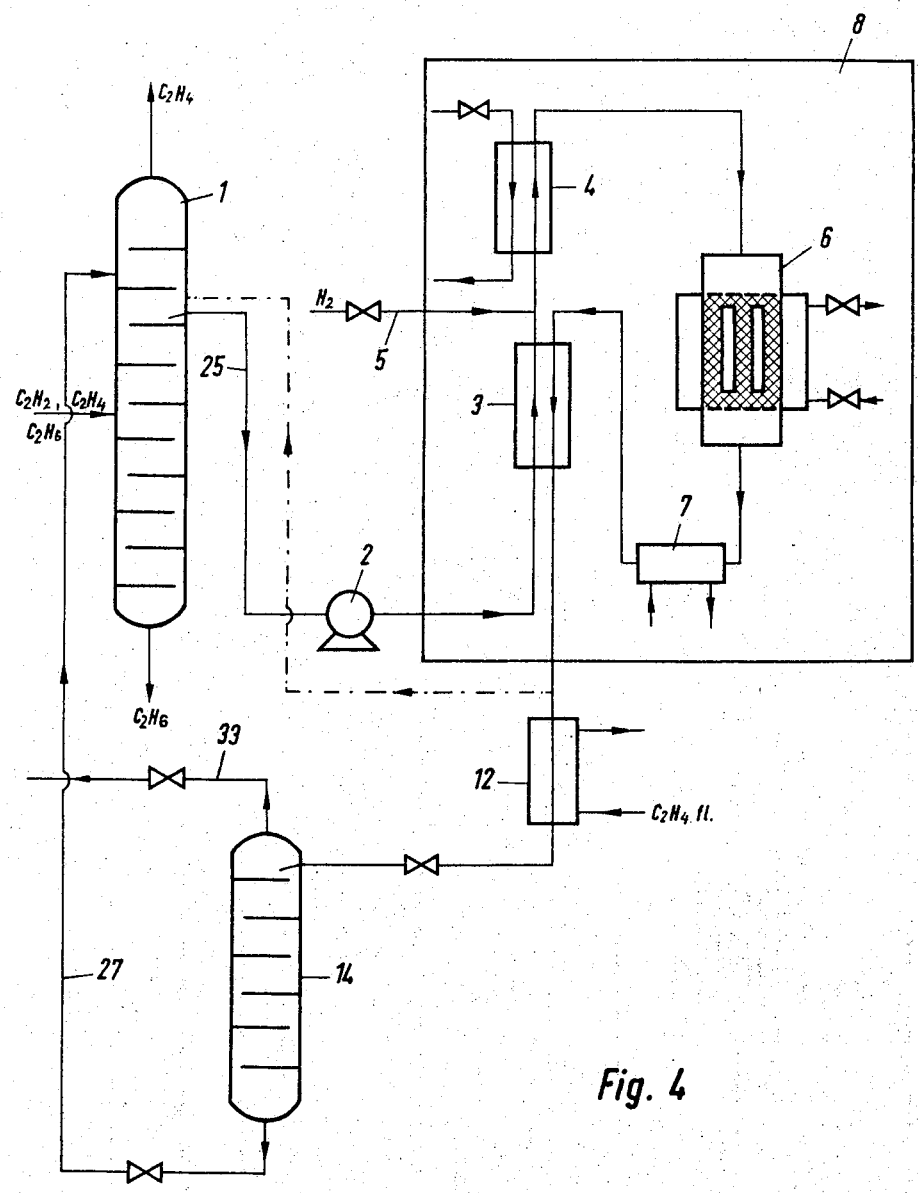

In Example III and the corresponding FIGURE 4, the separator is replaced by a stripping column. The mixture which is hydrogenated and purified in this manner is fed directly into the ethylene column.

In Example IV, which is described in connection with FIGURE 4, a larger amount of acetylene is withdrawn from the ethylene column than is added continuously with the cracked gas. The return is either directly, or, as in Example III, through a stripping column into the ethylene column.

Figure 5:
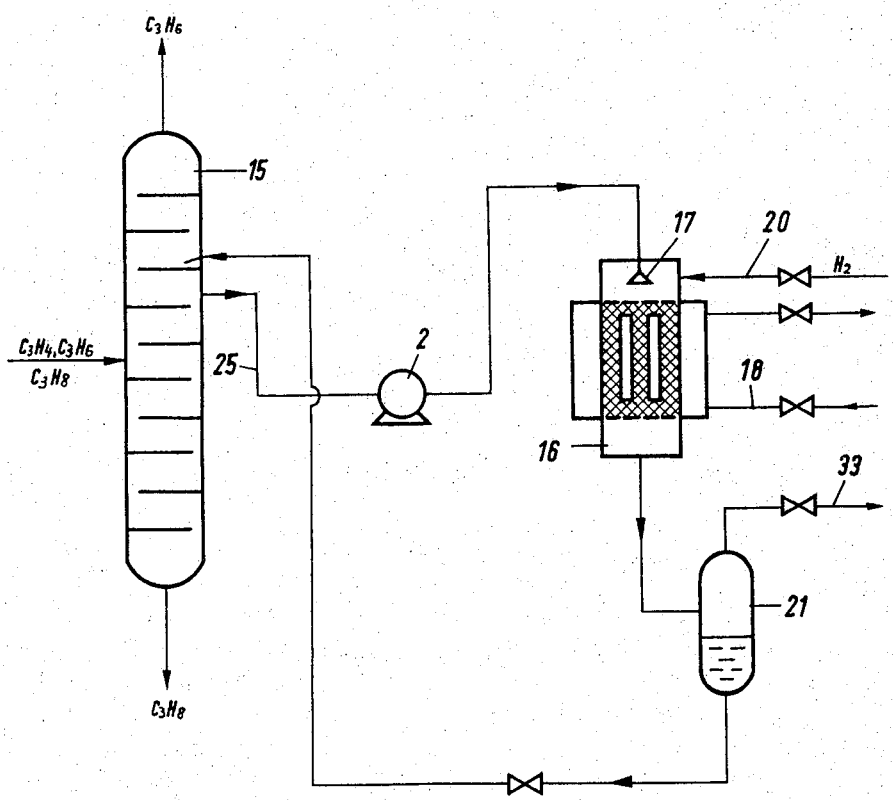

In Example V, described in connection with FIGURE 5, shows the separation of a $C_3$— mixture, the hydrogenation of the acetylene hydrocarbon occurring in the liquid phase.

*Example I*

In the separation of the crude gas in accordance with the procedure described with respect to FIGURE 1, 3000 normal cubic meters per hours of a $C_2$— fraction containing 75.2 mole percent ethylene, 24.3 mole percent ethane and 0.5 mole percent acetylene are obtained in the sump of the methane column 11 (FIGURE 2). When the feedback is carried out with recycle, this amount is raised to 3100 normal cubic meters per hour, which is then subjected to rectification in ethylene column 1, equipped with 100 plates. This rectification is carried out at a pressure of 1.4 atmospheres absolute. Pure ethylene is obtained as the head product and pure ethane as the tail product, the head temperature being 98° C. and the sump temperature 83° C. During this rectification operation the acetylene becomes slowly enriched in the ethylene column 1 so that the acetylene concentration would increase to about 40% at the 25th plate, if nothing was withdrawn. If, however, a 100 normal cubic meters per hour portion, corresponding to 225 liters of the liquid mixture, at a temperature of 88° C., is withdrawn through conduit 25, the acetylene concentration then becomes static at 15%, i.e., 15 normal cubic meters of acetylene per hour are removed from the ethylene column 1 as the latter receives the $C_2$— fraction.

The portion withdrawn is now compressed with the liquid pump 2 to 32 atmospheres absolute and then introduced into the hydrogenation apparatus 8. In the latter, the $C_2$— mixture is evaporated inside the heat exchanger 3 in countercurrent flow to the hydrogenated mixture, and after the addition of 18 normal cubic meters of hydrogen per hour, i.e., an amount which exceeds slightly the stoichiometrically required amounts, is preheated at 5 inside the steam heated preheater 4, to the reactor-inlet temperature of 150° C., and hydrogenated in the water-cooled reactor 6. A commercially available selective hydrogenation catalyst is used, such as, for example, palladium catalyst AH of the Badische Anilin- & Soda-Fabrik. The treated $C_2$— mixture leaves the reactor 6 at a temperature of about 200° C. It is then cooled in the water condenser 7, and thereafter partially liquefied inside the heat exchanger 3.

The hydrogenated mixture is now returned by conduit 30 to one stage of the separation apparatus for the cracking gas, the low-cooling Stage 9 being preferably selected. Into this stage is introduced at 28 a gas mixture which has already passed those stages, referred to in FIGURE 1 as Stages 1 to 3 (i.e. gas compression with removal of carbon dioxide and hydrogen sulfide; precooling to 230° K.; drying). This crude gas which is compressed, precooled, and dried, is partially liquefied in the low-cooling Stage 9, which is identical with Stage 4 of FIGURE 1, in the heat exchanger 29 in countercurrent flow to the separation products, which crude gas is then fed into the separator 10 which is under 30 atmospheres absolute pressure. The mixture which leaves the hydrogenation apparatus 8 is also fed through conduit 30 into this separator 10; it will flow into the latter under its own pressure, because the hydrogenation pressure is 32 atmospheres absolute. Inside the separator 10 the liquid portion of the hydrogenated mixture becomes mixed with the condensate from the cracking gas, and the gaseous fraction, together with the residual cracking gas, is additionally cooled in the next countercurrent setup 31. The condensates from the separators 10 and 26 are pressure relieved separately from each other inside the methane column 11, and are separated there into the methane fraction, which is the head product, and the $C_2$— fraction, which is the tail product and consists of ethylene, ethane and acetylene. The $C_2$— fraction is finally fed into the ethylene column 1. The residual gas which escapes from the last separator 26 of the low-cooling Stage 9 through the conduit 32 will, as described in the discussion of FIGURE 1, be removed from the instillation in countercurrent flow to the gas mixture being cooled.

*Example II*

The $C_2$— mixture to be separated is the same as used in Example I. The acetylene enrichment upon the 25th plate of the ethylene column 1 (cf. FIGURE 3) in the static state is limited to only 10 mole percent. The reflux ratio required is accordingly reduced somewhat, as well as the amount of cold required for the operation of the ethylene column, as compared to the operation described in Example I. There is next withdrawn through conduit 25 from the ethylene column 1, 150 normal cubic meters per hour, corresponding to 340 liters of liquid $C_2$— mixture. Because this portion after its hydrogenation is returned to methane column 11, which operates at about 2 atmospheres absolute, it is compressed by aid of the pump 2 to a pressure of approximately only 4 atmospheres absolute. The hydrogenation operation is carried out at this pressure as described in Example I. The partially liquefied mixture which leaves the hydrogenation apparatus 8, is further cooled in the ethylene evaporator and is partially liquefied. The gaseous and the liquid phases are separated inside the separator 13. The gas phase, which consists mostly of hydrogen, is returned through conduit 33 into the cracking gas ahead of the crude gas compressor. The liquid is pressure relieved inside the methane column 11.

*Example III*

The separator 13 of Example II is replaced in this experiment by the stripping column 14 (cf. FIGURE 4) which operates at 3 atmospheres absolute pressure, and the sump temperature of which is maintained at about 83° C. The dissolved and admixed hydrogen is separated from the liquid phase inside the column 14. The gaseous fraction from this stripping column contains a few normal cubic meters of $C_2$— mixture per hour as well as the excess hydrogenation hydrogen and the impurities, and is returned to the cracking gas prior to its compression. The $C_2$— fraction which leaves the sump of the stripping column 14 contains neither hydrogen nor methane, and may therefore, be returned directly into the ethylene column 1 by the aid of conduit 27, preferably at about the 30th plate thereof.

*Example IV*

The $C_2$— fraction is the same as used in Examples I–III. The static acetylene concentration on the 25th plate of the ethylene column 1 is 10%.

From the ethylene column 1 (cf. FIGURE 4) 180 normal cubic meters per hour, corresponding to about 400 liters of liquid $C_2$— mixture, are withdrawn through conduit 25 by the aid of pump 2, compressed to 4 atmospheres absolute pressure, and then evaporated inside the countercurrent flow unit 3, and mixed through conduit 5 with 15 normal cubic meters of hydrogen per hour, and then heated in the heater 4 to the reactor inlet temperature of about 100° C. The catalyst inside reactor 6 can, for example, be a nickel catalyst the selectivity of which is guaranteed by the stoichiometric supply of hydrogen. Under the conditions selected only the amount of acetylene corresponding to the amount of hydrogen available is selectively hydrogenated, i.e., 15 normal cubic meters per hour—the same amount which is constantly supplied with the cracking gas, and when all of the hydrogen is used thereby.

If the amount of impurity introduced into the $C_2$— mixture by the hydrogenation hydrogen is so small that it does not disturb the final purity of the ethylene produced, then the mixture which leaves the hydrogenation unit 8 can be returned directly to the ethylene column 1 a few plates above the location at which the mixture is withdrawn (cf. semicolon line in FIGURE 4). If, however, the hydrogenation hydrogen contains disturbing amounts of nitrogen or methane then the mixture which leaves the hydrogenation unit 8 must undergo the further treatment described in Example III.

*Example V*

One thousand normal cubic meters per hour of $C_3$— fraction obtained from a $C_3/C_4$— separation stage (cf. FIGURE 1 Stage 7) and containing 627 normal cubic meters of propylene, 360 normal cubic meters of propane, 9 normal cubic meters of propane and 4 normal cubic meters of propadiene, are rectified in the propylene colume 15 (cf. FIGURE 5) under 15 atmospheres absolute pressure. Inside this column, which has 150 plates, the maximum amount of propyne becomes enriched at the 50th plate. From this plate is withdrawn 150 normal cubic meters per hour, corresponding to about 550 liters per hour of liquid $C_3$— mixture, a static concentration of 6 mole percent of propyne being attained. The mixture, withdrawn at a temperature of 23° C. through conduit 25, is compressed by aid of the liquid pump 2 to a pressure of 20 atmospheres absolute pressure, and then selectively hydrogenated. Inside the reactor 16 the saturation pressure of the $C_3$— mixture is kept at 10–15 atmospheres absolute pressure by the aid of the built-in cooler 18. The hydrogenation pressure is adjusted to 20 atmospheres absolute pressure, by continuously adding hydrogen at 20 to make up for the amount thereof used up (about 13 normal cubic meters per hour). The liquid $C_3$— mixture is distributed by aid of the baffle 17 and thus the hydrogen $C_3$— hydrogen mixture is passed through tubes containing the finely divided catalyst. The catalyst can be alumina in various shapes (Raschig rings, Berl saddles, etc.) impregnated or coated with palladium.

The hydrogenated liquid $C_3$— mixture, the temperature of which rises by 5 to 10° C. as it passes over the finely divided catalyst in the reactor, is collected in the collecting vessel 21. If pure hydrogen is used for hydrogenating and if the amount of hydrogen which becomes dissolved in the pure propylene (about one cubic meter per hour) does not interfere with the product, then the liquid $C_3$— mixture is returned directly from the collecting vessel 21 into the propylene column 15 a few plates above the point of withdrawal. If, however, hydrogen is used which is relatively high in nitrogen and methane, then the $C_3$— liquid is fed from the container 21 into the $C_2/C_3$— column (Stage 5 in FIGURE 1). The gas phase from vessel 21 in both cases is returned through conduit 33 into the crude gas which has not yet undergone compression.

The selective hydrogenation of the $C_3$— mixture withdrawn from the propylene column 15 may also be carried out in the gas phase, with apparatus similar to that shown in FIGURES 2 or 3.

The position and the maximum of the enrichment of the component to be selectively hydrogenated depends upon the composition of the fraction to be separated, and upon the desired purity of the product, i.e. it depends upon the number of plates and upon the return ratio in the rectification column, as well as the location of withdrawal which is best suited for carrying out the procedure according to the present invention. Also, the portion withdrawn may be different in actual applications from the numerical values given in the above examples.

What is claimed is:

1. A process for the separation of a gas mixture, said gas mixture containing at least three components of low, intermediate, and high vapor pressures, respectively, which process comprises:
   (1) a separation step of separating an enriched mixture consisting essentially of said at least three components from said gas mixture;

(2) rectifying said enriched mixture of at least three components at a pressure below that of said separation step and during said rectification withdrawing as a side stream a liquid portion from the rectification column at a point of about the greatest enrichment of the component having said intermediate vapor pressure;

(3) pumping said withdrawn liquid portion to a pressure higher than that of said separation step;

(4) heating said withdrawn liquid pressurized portion and subjecting it to selective hydrogenation of the component having said intermediate vapor pressure;

(5) recycling at least a part of said hydrogenated portion in the liquid phase to a preceding step of said separation process of the gas mixture, the pressure of said selective hydrogenation being sufficient so that the recycling can be done without further compression.

2. The process of claim 1 wherein the liquid portion of said mixture removed from said rectification column as a side stream is from $\frac{1}{3}$ to $\frac{1}{30}$ of the total amount of enriched mixture fed into said rectification column.

3. The process of claim 1 wherein the enriched mixture undergoing rectification comprises a $C_2$— hydrocarbon mixture.

4. The process of claim 3 wherein the portion of said mixture removed from said rectification column is from $\frac{1}{10}$ to $\frac{1}{30}$ of the total amount of multiple component mixture fed into said rectification column.

5. The process of claim 1 wherein the enriched mixture undergoing rectification consists of acetylene, ethylene and ethane.

6. The process of claim 1 wherein the enriched mixture undergoing rectification comprises a $C_3$— hydrocarbon mixture.

7. The process of claim 6 wherein the portion of said mixture removed from said rectification column as a side stream is from $\frac{1}{3}$ to $\frac{1}{8}$ of the total amount of enriched mixture fed into said rectification column.

8. The process of claim 1 wherein the enriched mixture undergoing rectification consists of propylene, propane, propyne and propadiene.

9. Process for the separation of multiple component mixtures selected from the group consisting of $C_2$— and $C_3$— hydrocarbon mixtures in which one component is subject to selective hydrogenation and has a vapor pressure in the mixture which lies between the vapor pressures of the other components, which comprises subjecting said multiple component mixture to rectification in a rectification column and during said rectification withdrawing from said rectification column at the point of greatest enrichment a portion of the component having said intermediate vapor pressure, said portion being in liquid form and representing from $\frac{1}{3}$ to $\frac{1}{30}$ of the total amount of multiple component mixture being fed to the said rectification column, bringing said removed liquid portion by the aid of a liquid pump to the pressure at which selective hydrogenation thereof is to be effected, said pressure being higher than the pressure in the said rectifying column at the point at which said portion is removed from said column, subjecting said withdrawn portion to selective hydrogenation, and returning said hydrogenated product to said rectification column at approximately the point at which the unhydrogenated portion was removed therefrom.

10. Process for the separation of multiple component mixtures selected from the group consisting of $C_2$— and $C_3$— hydrocarbon mixtures in which one component is subject to selective hydrogenation and has a vapor pressure in the mixture which lies between the vapor pressures of the other components, which comprises subjecting said multiple component mixture to rectification in a rectification column and during said rectification withdrawing from said rectification column at the point of greatest enrichment a portion of the component having said intermediate vapor pressure, said portion being in liquid form and representing from $\frac{1}{3}$ to $\frac{1}{30}$ of the total amount of multiple component mixture being fed to the said rectification column, bringing said removed liquid portion by the aid of a liquid pump to the pressure at which selective hydrogenation thereof is to be effected, said pressure being higher than the pressure in the said rectifying column at the point at which said portion is removed from said column, subjecting said withdrawn portion to selective hydrogenation and rectifying said hydrogenated product to form a more volatile overhead vapor, and a less volatile bottoms liquid, recovering the overhead as product, and recycling said bottoms to said rectification column.

11. Apparatus for the separation of multiple component mixtures in which one component is subject to selective hydrogenation and has a vapor pressure in the mixture which lies between the vapor pressures of the other components, which comprises a rectification column, means for introducing said multiple component mixture into the said rectification column, a conduit leading from an intermediate plate of the said rectification column, to a liquid pump for the compression of the product withdrawn from said rectification column through said conduit, a selective hydrogenation unit connected by a conduit to said pump, and a conduit for returning hydrogenated material from said hydrogenation unit to a stage of the process for recovering the hydrogenated elements and the unhydrogenated multiple components.

References Cited

UNITED STATES PATENTS 3,153,679    10/1964    Rottmayr ---------- 260—677

SAMUEL P. JONES, *Primary Examiner.*